(12) United States Patent
Benedict

(10) Patent No.: US 9,874,058 B2
(45) Date of Patent: Jan. 23, 2018

(54) FATIGUE RESISTANT THREAD PROFILE WITH COMBINED CURVE ROUNDING

(71) Applicant: BAKER HUGHES INCORPORATED, Houston, TX (US)

(72) Inventor: Detlev Benedict, Nienhagen (DE)

(73) Assignee: Baker Hughes, a GE company, LLC, Houston, TX (US)

(*) Notice: Subject to any disclaimer, the term of this patent is extended or adjusted under 35 U.S.C. 154(b) by 417 days.

(21) Appl. No.: 14/448,385

(22) Filed: Jul. 31, 2014

(65) Prior Publication Data

US 2016/0032663 A1 Feb. 4, 2016

(51) Int. Cl.
*F16L 15/00* (2006.01)
*E21B 17/042* (2006.01)
*F16L 15/06* (2006.01)

(52) U.S. Cl.
CPC ........... *E21B 17/042* (2013.01); *F16L 15/001* (2013.01); *F16L 15/06* (2013.01)

(58) Field of Classification Search
CPC ................................. F16L 15/001; F16L 15/06
USPC ................. 285/390, 355, 333, 334
See application file for complete search history.

(56) References Cited

U.S. PATENT DOCUMENTS

| | | | |
|---|---|---|---|
| 4,004,832 A | 1/1977 | Connelly | |
| 4,549,754 A | 10/1985 | Saunders et al. | |
| 4,799,844 A | 1/1989 | Chuang | |
| 4,861,210 A | 8/1989 | Frerejacques | |
| 5,735,658 A | 4/1998 | Haerle | |
| 5,931,511 A | 8/1999 | Delange et al. | |
| 6,030,004 A * | 2/2000 | Schock | F16B 33/02 285/333 |
| 6,467,818 B1 | 10/2002 | Snapp et al. | |
| 6,729,658 B2 | 5/2004 | Verdillon | |
| 7,455,329 B2 | 11/2008 | Breihan et al. | |
| 7,690,697 B2 | 4/2010 | Church | |
| 7,731,466 B2 | 6/2010 | Shea et al. | |
| 8,079,623 B2 * | 12/2011 | Pallini, Jr. | F16L 15/004 285/333 |
| 8,215,680 B2 | 7/2012 | Santi | |

(Continued)

OTHER PUBLICATIONS

PCT/US2015/042629—International Search Report dated Oct. 19, 2015.

*Primary Examiner* — Aaron Dunwoody
(74) *Attorney, Agent, or Firm* — Mossman, Kumar & Tyler, PC

(57) ABSTRACT

A threaded connector that includes a pin end having external threads and a box end having internal threads that are complementary to the external threads has a thread profile that defines at least a portion of either or both of the internal threads and the external threads. The thread profile may include a thread root connecting a first flank to a second flank and the thread root may be at least partially defined by a plurality of tangentially interconnected radii. The plurality of radii may include at least a medial radius, a first distal radius on one side of the medial radius, and a second distal radius on the another side of the medial radius. The medial radius may be larger than the first and the second distal radius. Alternatively, the thread profile includes a thread root connecting a first flank to a second flank that is at least partially defined by a plurality of radii, each radius having a different length and each defining a circular arc.

15 Claims, 4 Drawing Sheets

(56) References Cited

U.S. PATENT DOCUMENTS

| | | |
|---|---|---|
| 8,544,304 B2 | 10/2013 | Santi |
| 8,671,547 B2 | 3/2014 | Matsubayashi et al. |
| 8,678,448 B2 | 3/2014 | Maillon et al. |
| 2002/0113436 A1 | 8/2002 | Verdillon |
| 2005/0161259 A1 | 7/2005 | Kaul |
| 2009/0047095 A1 | 2/2009 | Pritchard |
| 2011/0012347 A1 | 1/2011 | Pacheco |
| 2013/0147191 A1 | 6/2013 | Mazzaferro et al. |
| 2013/0277963 A1 | 10/2013 | Carrois et al. |

* cited by examiner

FATIGUE RESISTANT THREAD PROFILE WITH COMBINED CURVE ROUNDING

BACKGROUND OF THE DISCLOSURE

1. Field of the Disclosure

This disclosure relates generally to oilfield downhole tools and more particularly to methods and devices for transferring rotary power to a consumer.

2. Description of the Related Art

Threaded connections are a prevalent method to join two or more members such as pipe sections. In certain applications, as during hydrocarbon exploration and recovery operations, a string of pipe sections joined by threaded connections may be rotated in a well bore. For example, a drill string may be rotated to urge a bottomhole assembly into a subterranean formation. The bottomhole assembly (BHA) also may include components that are mated or joined with threaded connections. In certain instances, drilling activity may cause the string and BHA to bend. As is known, the bending of threaded connection induces compression on one side of the threaded connection and a tension on the other side of the threaded connection. Because the threaded connection is rotating, the tension and compression is cyclical. It is, of course, also known that cyclical bending stresses imposed by even moderate loadings may lead to failure of the threaded connection (e.g., high cycle fatigue).

The harsh drilling conditions of the well bore environment or deviated well bores can cause such cyclical bending stresses in these threaded connections. Unfortunately, conventional threaded connections, such as those specified by the American Petroleum Institute (API), do not always possess sufficient bending fatigue resistance to support advanced drilling programs or complex well bore trajectories. For example, in some instances, drilling operations and hydrocarbon recovery may require a highly deviated well bore, e.g., a well bore having a sharp radius portion. Form deviated wellbore sections requires a BHA and drill string that can withstand a relatively high "build-up rate." Conventional threaded connections subjected to such build-up rates can suffer reduced operational lifetime or require additional maintenance or rework. Moreover, even common drilling conditions slowly degrade conventional threaded connections such that these connections must be either changed-out or reworked. The costs incurred in such activity not only include the maintenance itself but, for example, the delay in drilling activities.

The present invention addresses these and other drawbacks of conventional threaded connections.

SUMMARY OF THE DISCLOSURE

In aspects, the present disclosure provides a threaded connector that includes a pin end having external threads and a box end having internal threads that are complementary to the external threads. The connector also includes a thread profile that defines at least a portion of either or both of the internal threads and the external threads. The thread profile may include a thread root connecting a first flank to a second flank and the thread root may be at least partially defined by a plurality of tangentially interconnected radii. The plurality of radii may include at least a medial radius, a first distal radius on one side of the medial radius, and a second distal radius on the another side of the medial radius. The medial radius may be larger than the first and the second distal radius.

In a related aspect, the present disclosure uses a thread profile that includes a thread root connecting a first flank to a second flank. The thread root may be at least partially defined by a plurality of radii, each radius having a different length and each defining a circular arc.

In further aspects, the present disclosure provides a method for forming a threaded connection. The method may include forming a pin end to have external threads, and forming a box end to have internal threads that are complementary to the external threads. A thread profile that defines at least a portion of one or both of the internal threads and the external threads may include a thread root connecting a first flank to a second flank. The thread root may be at least partially defined by a plurality of tangentially interconnected radii. The plurality of radii may include at least a medial radius, a first distal radius on one side of the medial radius, and a second distal radius on the another side of the medial radius. The medial radius may be larger than the first and the second distal radius.

Illustrative examples of some features of the disclosure thus have been summarized rather broadly in order that the detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION OF THE DISCLOSURE

Figure 1:
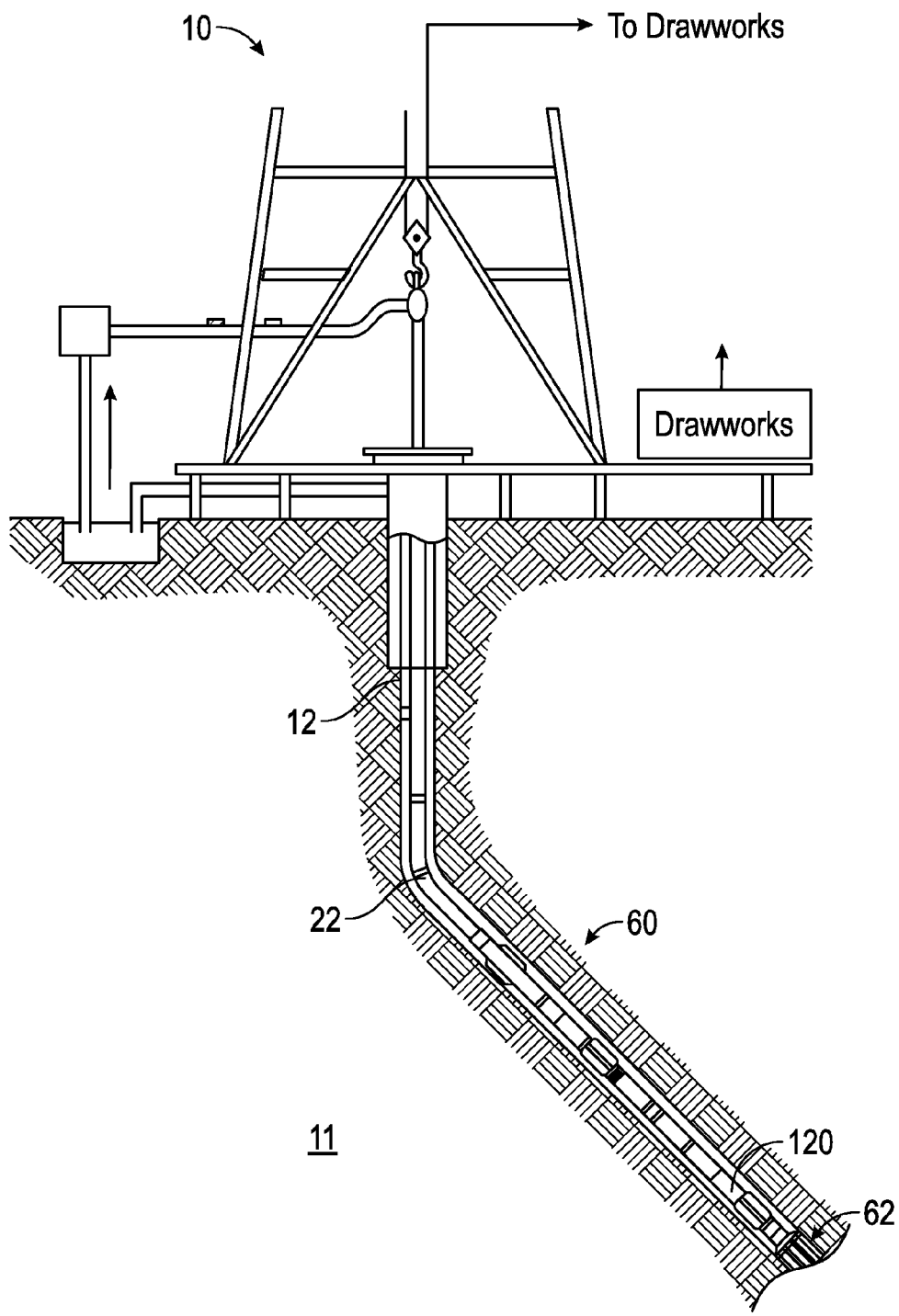
FIG. 1 shows a schematic diagram of a well construction system with a bottomhole assembly utilizing the threaded connection of the present disclosure.

The present invention relates to an apparatus and methods for increasing the fatigue resistance of pin and box connections or couplings subjected to cyclic bending stresses, particularly in oilfield applications. Aspects of the present disclosure provide an optimized thread profile rounding that may reduce the local stress at the root of a thread and thus may increase the fatigue strength of a thread connection. The optimized shape of the rounding at the thread root may be a combination of at least two radii having different sizes. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

In FIG. 1, there is shown an embodiment of a drilling system 10 utilizing a bottomhole assembly (BHA) 60 configured for drilling wellbores. While a land system is shown, the teachings of the present disclosure may also be utilized in offshore or subsea applications. In FIG. 1, a laminated earth formation 11 is intersected by a wellbore 12. The BHA 60 is conveyed via a drill string 22 into the wellbore 12. The drill string 22 may be jointed drill pipe or coiled tubing, which may include embedded conductors for power and/or data for providing signal and/or power communication between the surface and downhole equipment. The BHA 60 may include a drill bit 62 for forming the wellbore 12. In some embodiments, the BHA 60 may include one or more rotary power sources such as a drilling motor 120.

In a common mode of operation, a pressurized drilling fluid is pumped down to the BHA 60 from the surface via the drill string 22. This flowing drilling fluid may be utilized to energize the drilling motor 120, which generates rotary power that rotates the drill bit 62. The flowing drilling mud can also energize turbines or other similar devices that extract energy from the flowing drilling fluid. The extracted energy may be utilized to generate electricity and/or pressure hydraulic fluids. It should be understood that generating rotary power (i.e., generating useful torque) and electrical power generation and pressuring of fluids are merely illustrative of a variety of functions that may be performed by a consumer of rotary power.

Figure 2:
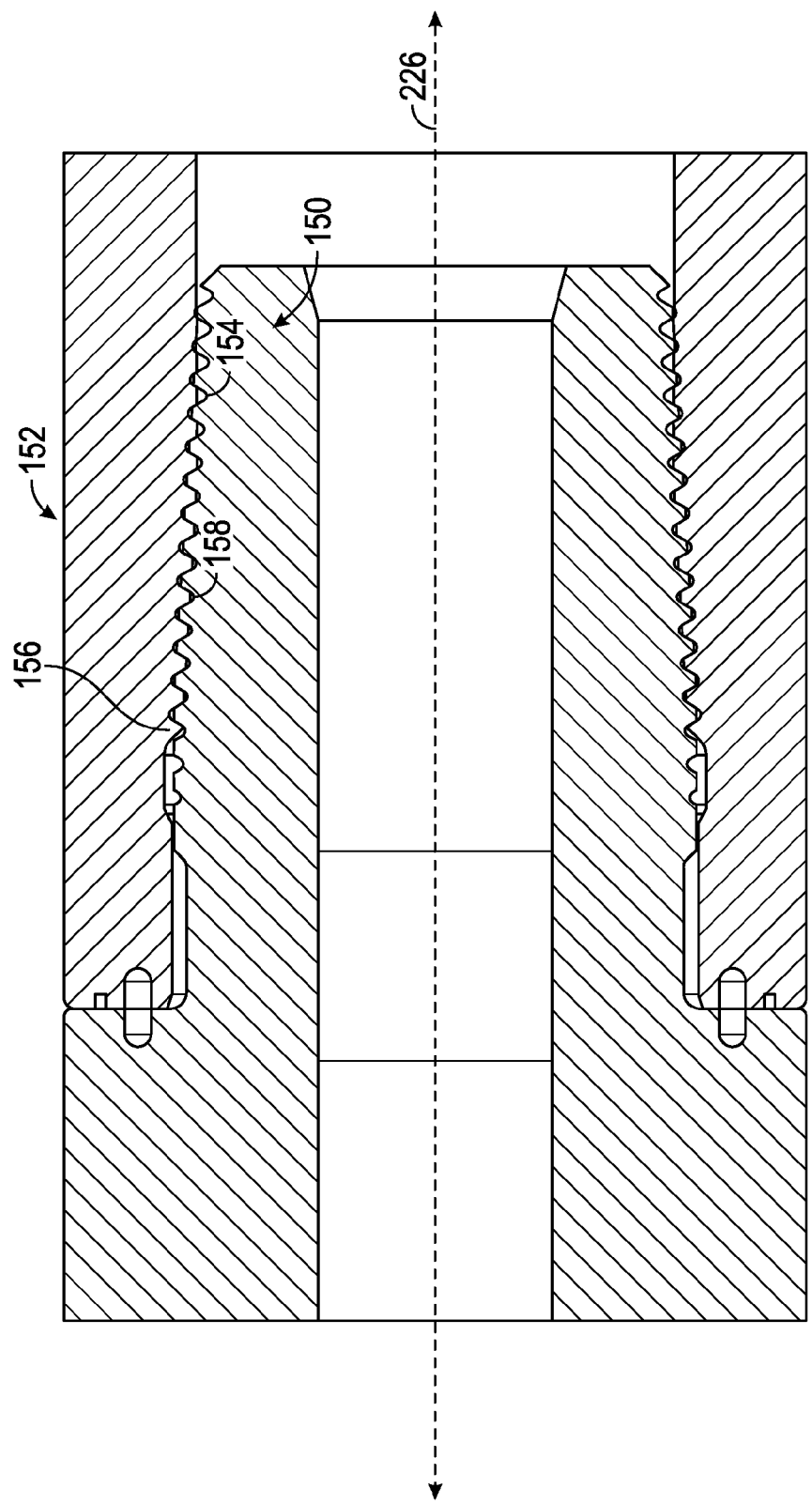
FIG. 2 shows a sectional schematic view of an exemplary connection that may use thread arrangements in accordance with the present disclosure.

Referring to FIG. 2, the threaded connection may include a pin end 150 and a box end 152. In a conventional manner, the pin end 150 has external threads 154 and the box end 152 has internal threads 156. The FIG. 2 connection may be used to connect the jointed pipe of the drill string 22 (FIG. 1), the subs and other components of the BHA 60 (FIG. 1), etc. The FIG. 2 connection may also be used in any other well tools including, but are not limited to, under-reamers, reamers, pipe cutting tools, etc.

Figure 3:
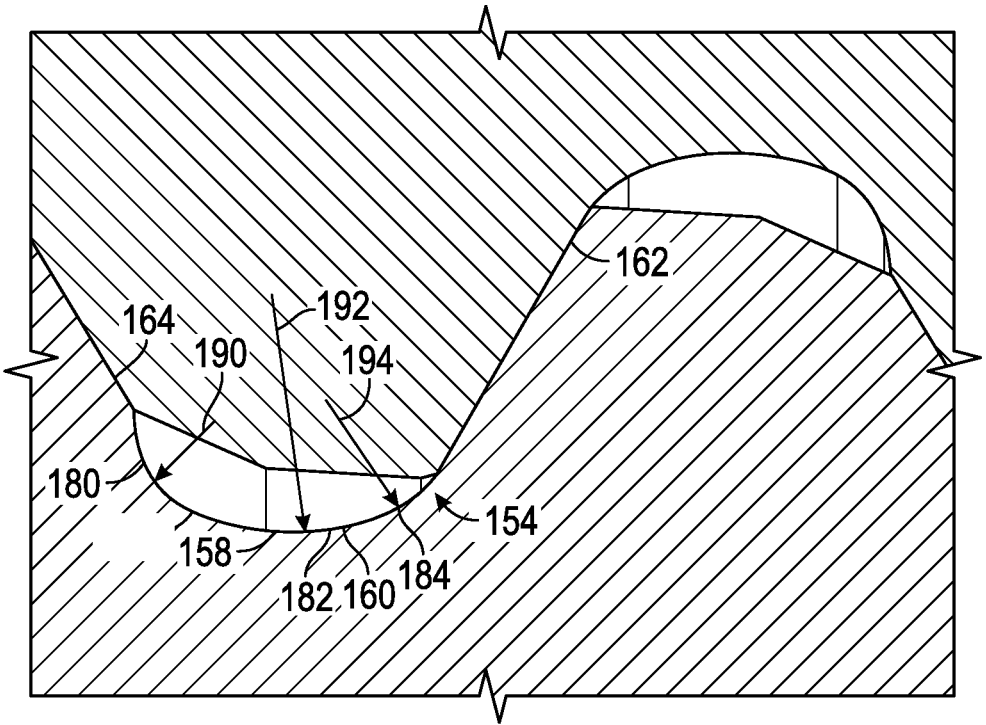
FIG. 3 illustrates an exemplary thread root having three radii in accordance with one embodiment of the present disclosure.

Referring to FIG. 3, there is shown in greater detail a root 158 of a thread profile of the external thread 154. As used herein, the term "thread profile" refers to the thread form or configuration of a thread in an axial plane and which is generally considered to include a crest, a root, and flanks. The stress concentration at the root 158 is influenced by a length of a radius defining one or more circular arcs of a surface 160 between a load flank 162 and a trailing flank 164 of a thread, e.g., thread 154. As used herein, the radius of a circle is the length of the line from the center to any point on its edge. Typically, the stress decreases with increased radius length. If certain parameters of the thread profile are fixed (e.g., pitch or tooth width, flank angle, height etc.) the possibility of increasing the radius is minimal. Herein, referring to a radius of a root is the same as referring to a circular arc defined by that radius; i.e., such references are to be considered interchangeable. Thus, when a root of a thread profile is said to have a specified radius, it is meant that at least a portion of a surface defining that root follows a circular arc defined by the specified radius. The length of an arc depends on both radius and a spanning angle.

Embodiment of the present disclosure use a combination of radii (hereafter, Combined Curve Rounding—CCR) with increased radius lengths to thereby increase the corresponding radius curvature at selected locations along the surface 160 joining the load flank 162 and the trailing flank 164. In the non-limiting embodiment of FIG. 3, the surface 160 joining the load flank 162 and the trailing flank 164 is defined by arcs 180, 182, 184, each having a radius 190, 192, 194. CCR involves placing a relatively small "sharp" radius at the less critical positions of the thread root (e.g., immediately adjacent to the flanks) and increasing the radius at the more critical position—typically in the medial portion, or middle, of the root 158. In a non-limiting arrangement, the radius 190 may be 0.70 mm, the radius 192 may be 1.8 mm, and the radius 194 may be 0.60 mm. When compared to a conventional profile that is defined by a single radius of 1.15 mm, the critical maximum radius at the thread root 158 may be increased by more than 50% (from 1.15 mm to 1.8 mm). Moreover, the depth of the thread profile is slightly reduced and thus consumes less radial space for pin and box threads.

Figure 4:
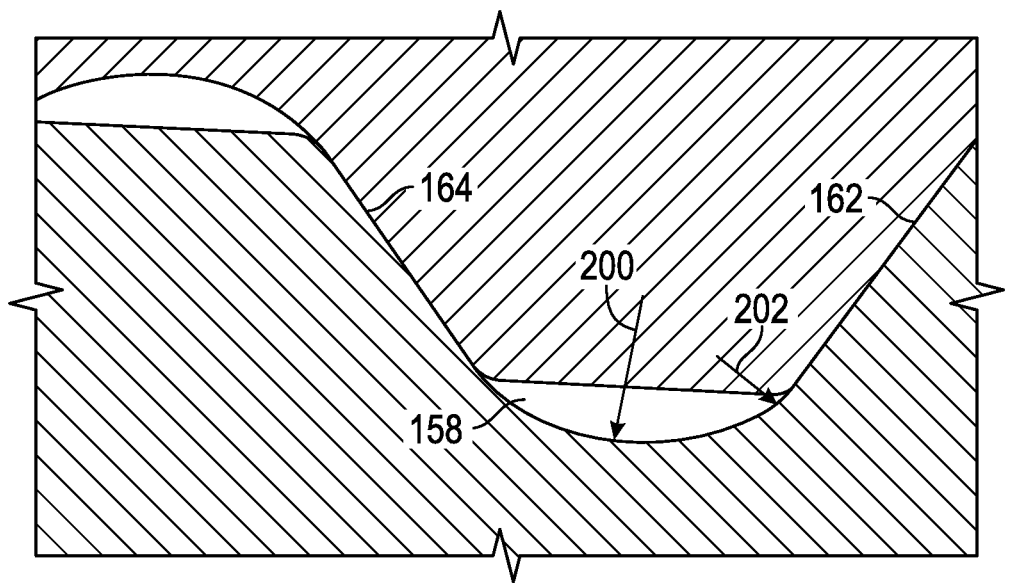
FIG. 4 illustrates an exemplary thread root having two radii in accordance with one embodiment of the present disclosure.
Figure 5A:
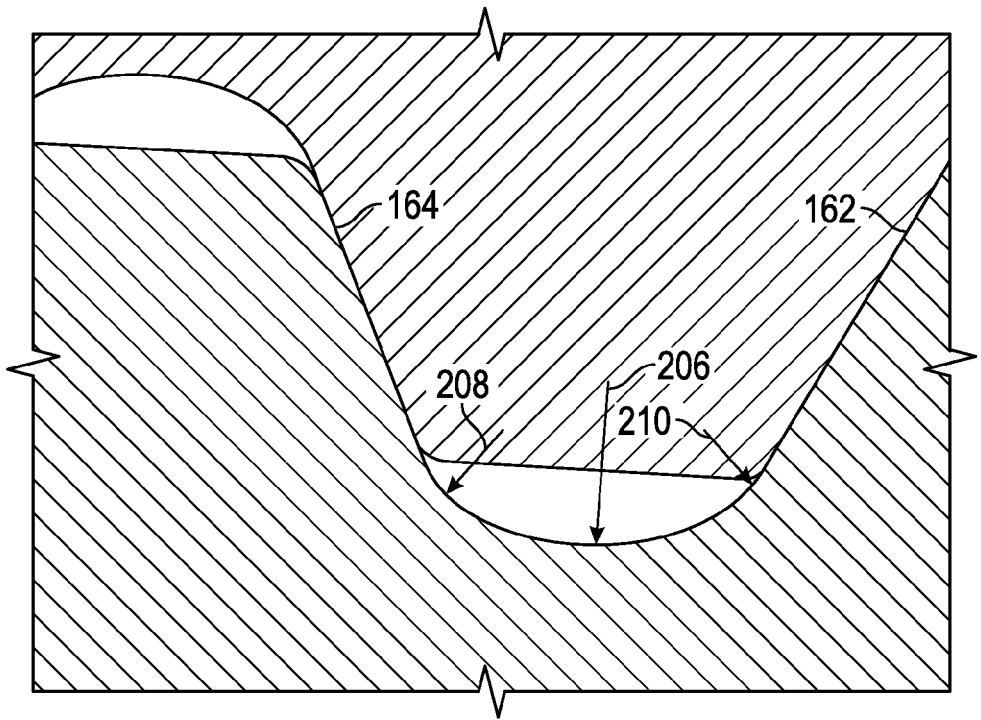
FIGS. 5A and 5B illustrate exemplary thread roots having three radii in accordance with embodiments of the present disclosure.

Referring to FIG. 4, in embodiments, a thread profile using CCR at the thread root 158 may include 2 different radii (e.g., R1 and R2). Radius R1 200 may be at least 1.5 times larger than Radius R2 202. Referring to FIG. 5A, in another embodiment, a thread profile may use three radii (R1, R2 and R3). In such embodiments, Radius R1 206 may be two to four times larger than Radius R2 208 and two to four times larger than R3 210. The smaller radii (R2 208 and R3 210) may be on opposing sides of the largest radius (R1 206). All of the radii (R1-R3 206, 208, 210) are preferably connected tangentially among themselves. The straight load flank 162 may be tangentially connected to a smaller radius (R2). The smaller radius R3 may either be tangentially connected directly to the trailing flank 164. The arcs of each radius R1, R2, R3 connect at end points. By tangentially connected, it is meant that a tangent line of each radius at an end point is substantially aligned; e.g., less than 10 degrees angular misalignment. In embodiments where a slanted load flank is used (e.g., 25° to 35°), the arc associated with radius R2 208 may cover about 25° to 45° and the arc associated with the radius R1 206 may cover about 35° to 65°.

Figure 5B:
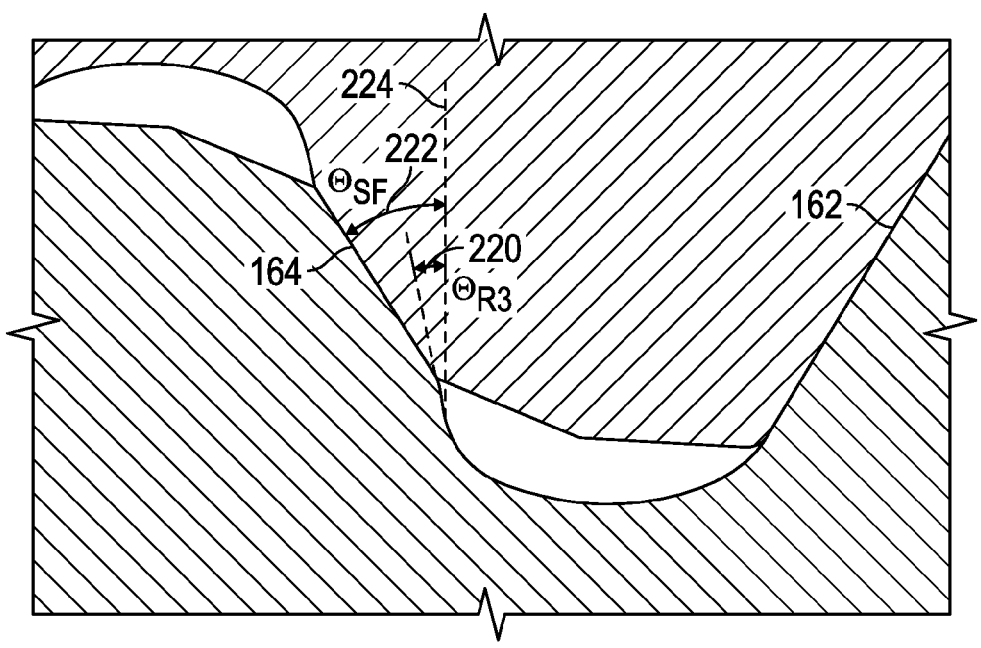

Alternatively, as shown in FIG. 5B, a run-out at an angle θR3 220 may be smaller than an angle θSF 222 of the trailing flank 164. The load flank 162 may include a tangential connection as described previously. The ΘR3 220, ΘSF 222 may be with reference to a plane 224 that is orthogonal to a longitudinal axis 226 (FIG. 2) of the connection.

It should be appreciated that these values are provided with specificity merely for convenience and that the present invention is by no means limited to these values. Furthermore, it should be understood that these values are subject to applicable machining tolerances. Thus, these values merely indicate the general optimization technique that may be applied to minimize local stresses under given geometric constraints. It is believed that the general relationships between the described features of the thread profile will enhance the fatigue strength of nearly any diameter size connection utilizing an exemplary thread profile of the present invention.

In alternative embodiments to the present invention, the threads may be cold worked to increase of fatigue resistance, copper plated to increase of galling resistance, and/or shot peened to increase resistance against stress/corrosion/cracking. The threads may also include stress relief groove(s) to increase of fatigue resistance.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. It is intended that the following claims be interpreted to embrace all such modifications and changes.

The invention claimed is:

1. A threaded connector, comprising:
a pin end having external threads;
a box end having internal threads that are complementary to the external threads; and
a thread profile that defines at least a portion of one of the internal threads and the external threads, the thread profile including a thread root connecting a first flank to a second flank, the thread root being at least partially defined by a plurality of tangentially interconnected radii, the plurality of radii including at least:
a medial radius,
a first distal radius on one side of the medial radius, and
a second distal radius on the another side of the medial radius, wherein the medial radius is larger than the first and the second distal radius,
wherein the first distal radius is tangentially connected to the first flank at a first tangential connection and the second distal radius is tangentially connected to the second flank at a second tangential connection, and wherein a tangent line associated with at least one of the first tangential connection and the second tangential connection is aligned with one of the first and the second flanks.

2. The connector of claim 1, wherein the medial radius is at least 1.5 times greater than one of the first distal radius and the second distal radius.

3. The connector of claim 2, wherein the medial radius is no greater than 4.5 times of one of the first distal radius and the second distal radius.

4. The connector of claim 1, wherein each of the plurality of radii define a circular arc.

5. The connector of claim 1, wherein each radii has an associated arc, wherein the arcs connect to one another at endpoints, and wherein tangent lines of two radii are substantially aligned at each endpoint.

6. The threaded connector of claim 1, wherein the pin end and the box end are disposed along one of: (a) a drill string, and (b) a bottomhole assembly.

7. The connector of claim 1, wherein the second distal radius is connected to the second flank at an angle smaller than an angle defining an outer surface of the second flank.

8. A threaded connector, comprising:
a pin end having external threads;
a box end having internal threads that are complementary to the external threads;
a thread profile defining at least a portion of one of the internal threads and the external threads, the thread profile including a thread root connecting a first flank to a second flank, the thread root being at least partially defined by a plurality of radii, each radius having a different length and each defining a circular arc.

9. The connector of claim 8, wherein the first flank is a slanted load flank, and wherein a first radius of the plurality of radii defines an arc between about 25° to 45° and a second radius of the plurality of radii defines an arc between about 35° to 65°.

10. The connector of claim 8, wherein the plurality of radii is tangentially interconnected.

11. The connector of claim 8, wherein the plurality of radii includes a medial radius that is at least 1.5 times greater than an adjacent radius.

12. The connector of claim 8, wherein the plurality of radii includes a medial radius that is no greater than 4.5 times than an adjacent radius.

13. A method for forming a threaded connection, comprising:
forming a pin end to have external threads; and
forming a box end to have internal threads that are complementary to the external threads, wherein a thread profile that defines at least a portion of one of the internal threads and the external threads includes a thread root connecting a first flank to a second flank, and wherein the thread root is at least partially defined by a plurality of tangentially interconnected radii, the plurality of radii including at least:
a medial radius,
a first distal radius on one side of the medial radius; and
a second distal radius on the another side of the medial radius, wherein the medial radius is larger than the first and the second distal radius,
wherein the first distal radius is tangentially connected to the first flank at a first tangential connection and the second distal radius is tangentially connected to the second flank at a second tangential connection, and wherein a tangent line associated with at least one of the first tangential connection and the second tangential connection is aligned with one of the first and the second flanks.

14. The method of claim 13, wherein the medial radius is at least 1.5 times greater than one of the first distal radius and the second distal radius.

15. The method of claim 14, wherein the medial radius is no greater than 4.5 times of one of the first distal radius and the second distal radius.

* * * * *